(12) United States Patent
Oklejas, Jr.

(10) Patent No.: US 10,081,559 B2
(45) Date of Patent: Sep. 25, 2018

(54) METHOD AND SYSTEM FOR GENERATING CAVITATION IN A FLUID

(71) Applicant: Fluid Equipment Development Company, LLC, Monroe, MI (US)

(72) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 510 days.

(21) Appl. No.: 14/707,040

(22) Filed: May 8, 2015

(65) Prior Publication Data

US 2015/0321161 A1    Nov. 12, 2015

Related U.S. Application Data

(60) Provisional application No. 61/991,799, filed on May 12, 2014.

(51) Int. Cl.
| | |
|---|---|
| *B01F 5/00* | (2006.01) |
| *C02F 1/34* | (2006.01) |
| *B01J 19/00* | (2006.01) |
| *B01F 3/04* | (2006.01) |
| *B01F 5/02* | (2006.01) |
| *B01F 15/02* | (2006.01) |

(52) U.S. Cl.
CPC ............ *C02F 1/34* (2013.01); *B01F 3/04248* (2013.01); *B01F 5/0268* (2013.01); *B01F 15/0254* (2013.01); *B01J 19/008* (2013.01); *B01J 19/0053* (2013.01); *B01F 2003/04312* (2013.01); *B01J 2219/245* (2013.01)

(58) Field of Classification Search
CPC .................. B01F 5/0268; B01F 5/0062; B01F 2005/004; B01F 5/0057; B01F 3/04248; B01F 15/0254; B01F 2003/04312; B01J 4/002; B01J 19/0053; B01J 19/008; B01J 2219/245; C02F 1/34
USPC ................................. 366/173.1, 340; 138/37
See application file for complete search history.

(56) References Cited

U.S. PATENT DOCUMENTS

| | | | | |
|---|---|---|---|---|
| 4,087,862 A | * | 5/1978 | Tsien ..................... | B01F 5/0057 366/165.1 |
| 4,334,783 A | * | 6/1982 | Suzaka ..................... | B01F 3/10 366/341 |
| 4,441,823 A | * | 4/1984 | Power ................... | B01F 3/0807 138/42 |

(Continued)

FOREIGN PATENT DOCUMENTS

EP    1903009 A1    3/2008

OTHER PUBLICATIONS

International Search Report and Written Opinion regarding Application No. PCT/US2015/030093, dated Aug. 7, 2015. ISA/EP Rijswijk, NL.

*Primary Examiner* — Anshu Bhatia
(74) *Attorney, Agent, or Firm* — Harness, Dickey & Pierce, P.L.C.

(57) ABSTRACT

A cavitation plate and system comprises a plurality of flow elements through the thickness of the cavitation plate. Each of the plurality of flow elements comprises an inlet channel a converging nozzle coupled to the inlet channel, a throat in fluid communicating with the converging nozzle, a diverging diffuser in fluid communication with the throat and an outlet channel in fluid communication with the diverging diffuser.

19 Claims, 3 Drawing Sheets

(56) References Cited

U.S. PATENT DOCUMENTS 5,937,906 A * 8/1999 Kozyuk ............... B01F 5/0661
　　　　　　　　　　　　　　　　　　138/37

* cited by examiner

METHOD AND SYSTEM FOR GENERATING CAVITATION IN A FLUID

RELATED APPLICATION

This application is a non-provisional application of provisional application 61/991,799, filed May 12, 2014, the disclosure of which is incorporated by reference herein.

TECHNICAL FIELD

The present disclosure relates generally to fluid cavitation, and, more specifically, to a method and system for generating improved fluid cavitation within a fluid.

BACKGROUND

The statements in this section merely provide background information related to the present disclosure and may not constitute prior art.

Bacteria and viruses have a cell structure that may be compromised using hydrodynamic cavitation. The cell structure of the bacteria or viruses may be disrupted using hydrodynamic cavitation. Cavitation is the creation of bubbles of vapor within a liquid. The bubbles of vapor are created through the reduction in the static pressure below the vapor pressure, followed by an increase in static pressure causing a vapor bubble to collapse. The collapsing vapor bubble causes an extremely high pressure in the vicinity of the collapse that can damage the cell structure of bacteria. Bacteria and other suspended solids react as nucleation sites to facilitate bubble formation.

Current methods for generating cavitation bubbles include the use of impellers or rotors that produce high turbulence in the liquid. The high turbulence in turn produces cavitation bubbles to form and collapse in a chaotic manner. Vibrating surfaces immersed in a liquid also are used to cause cavitation bubbles. The vibrating surface causes cyclical pressure variation adjacent to the surface resulting in the formation and collapse of cavitation bubbles.

Drawbacks to currently known methods of cavitation have several deficiencies. For example, rotating components require shafts, rotors, shaft seals and bearings. Besides the costs of the moving components, a uniform and controllable level of cavitation is not formed using such components. The degree of cavitation may vary in different regions of a rotor because different relative velocities and static pressures may exist in a fluid chamber. The degree of cavitation is also difficult to predict due to the complex fluid motion at and around the rotating components. Intense cavitation may also damage components. Vibrating plates have a limited ability to generate cavitation and thus portions of the fluid may not be exposed to cavitation.

SUMMARY

The present disclosure provides a method and system for providing a controllable amount of cavitation in a liquid. The system may be used to accelerate the reduction of impurities of fluid or other process changes.

In one aspect of the disclosure, a cavitation plate and system comprises a plurality of flow elements through the thickness of the cavitation plate. Each of the plurality of flow elements comprises an inlet channel, a converging nozzle coupled to the inlet channel, a throat in fluid communicating with the converging nozzle, a diverging diffuser in fluid communication with the throat and an outlet channel in fluid communication with the diverging diffuser.

In another aspect of the disclosure, a method of decontaminating fluid comprises directing fluid having cellular matter therein into a converging nozzle of a flow element, reducing a static pressure of the fluid below a vapor pressure of the fluid, forming cavitation bubbles in the fluid, communicating the fluid, the cellular matter and cavitation bubbles into a diverging diffuser and collapsing the cavitation bubbles in the diverging diffuser and breaching the cellular matter in response thereto.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
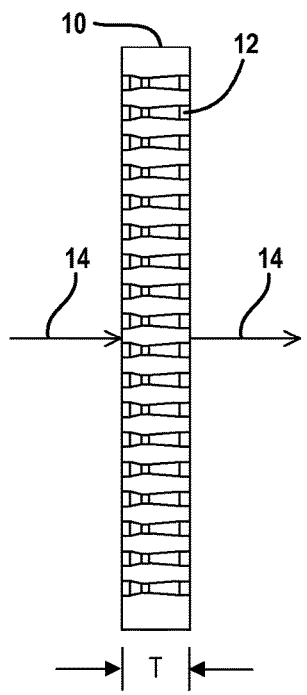
FIG. 1A is cross-sectional view of a cavitation plate of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

The present disclosure improves the generation and distribution of bubbles during a cavitation process.

Figure 1B:
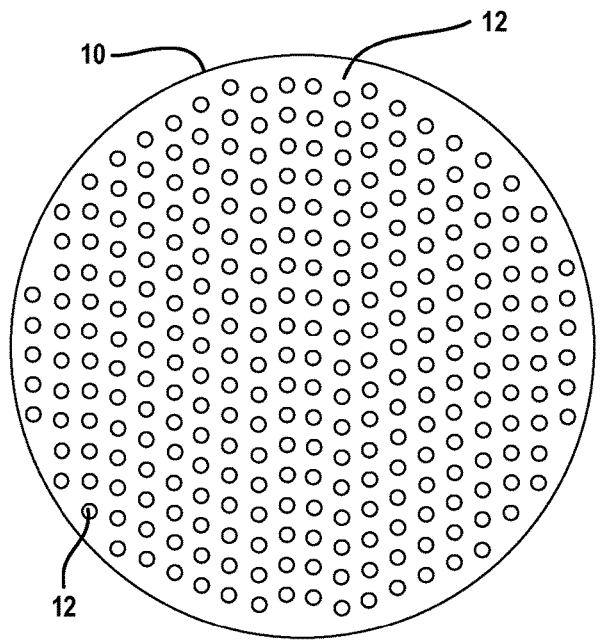
FIG. 1B is a front view of a cavitation plate according to the present disclosure.

Referring now to FIGS. 1A and 1B, a cavitation plate 10 is illustrated. The cavitation plate 10 is illustrated as a circular plate having a thickness T. The cavitation plate 10 has a plurality of flow elements 12 therethrough. The flow elements 12 form a fluid passage from one side of the cavitation plate 10 to the other side of the cavitation plate 10 through the thickness T. The flow elements 12 are used to form cavitation bubbles and collapse the cavitation bubbles. Fluid flows through the cavitation plate 10 in the direction illustrated by the arrows 14. In general, the fluid may flow in a longitudinal direction parallel to the longitudinal axis of a cylinder forming the cavitation plate. The fluid may contain contaminants such as cellular material such as, but not limited to, bacteria and viruses. As will be described below, one or more cavitation plates may be used in a system depending upon the system requirements. Further, the arrangement and number of flow elements 12 may also vary depending upon the system in which the cavitation plates are used.

The flow elements 12 illustrated through the cavitation plate 10 may all be oriented in the same direction. That is, the flow elements 12 may all be parallel to each other. The flow elements 12 may also be parallel to the general flow illustrated by the arrows 14.

Figure 2:
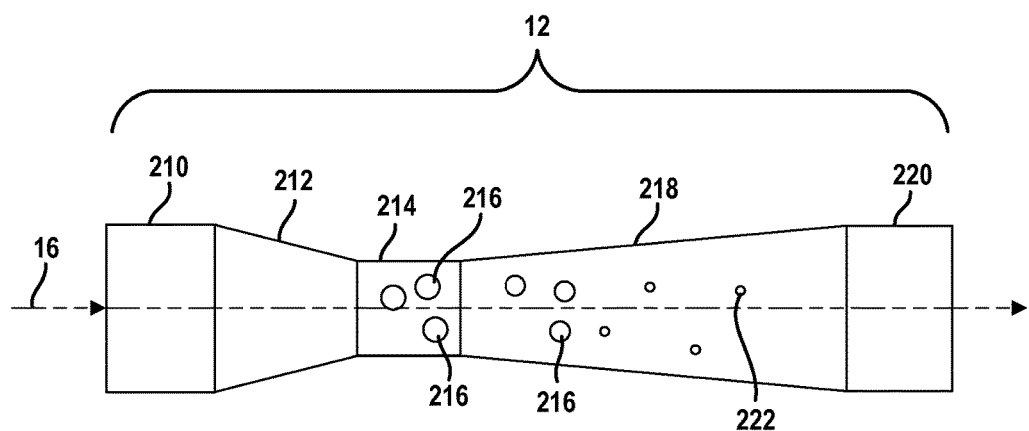
FIG. 2 is a cross-sectional view of a flow element of a cavitation plate.

Referring now to FIG. 2, each of the plurality of flow elements 12 may be constructed in a similar manner. One flow element 12 is illustrated in FIG. 2. The flow element 12 may have a longitudinal axis 16 through the center thereof. Each of the elements may be circular in cross-section. Liquid plus contaminants to be treated enters the flow element 12 through an inlet channel 210. The inlet channel 210 is in fluid communication with a converging nozzle 212. The converging nozzle 212 reduces the diameter of the fluid passage from the inlet channel diameter to a reduced diameter. The converging nozzle 212 is in fluid communication with a throat 214. The converging nozzle 212 accelerates the fluid from the inlet channel 210 to a higher velocity in the throat 214. The static pressure drops in response to the increased flow in accordance with Bernoulli's equation. The flow channel is designed and operated such that the static pressure falls below the vapor pressure in the throat 214 which results in the formation of cavitation bubbles 216. The bubbles and the fluid are moved from the throat 214 into a diverging diffuser 218. The diverging diffuser has a first diameter at the throat 214 which is less than the diameter adjacent to an outlet channel 220. The velocity of the fluid in the diverging diffuser 218 results in a static pressure increase causing the cavitation bubbles 216 to collapse. The collapsing bubbles expose contaminants such as cellular matter to intense pressure causing damage and sterilization. The collapsing bubbles may cause the cellular matter to be breached. Collapsed bubbles are illustrated as reference numeral 222.

Figure 3:
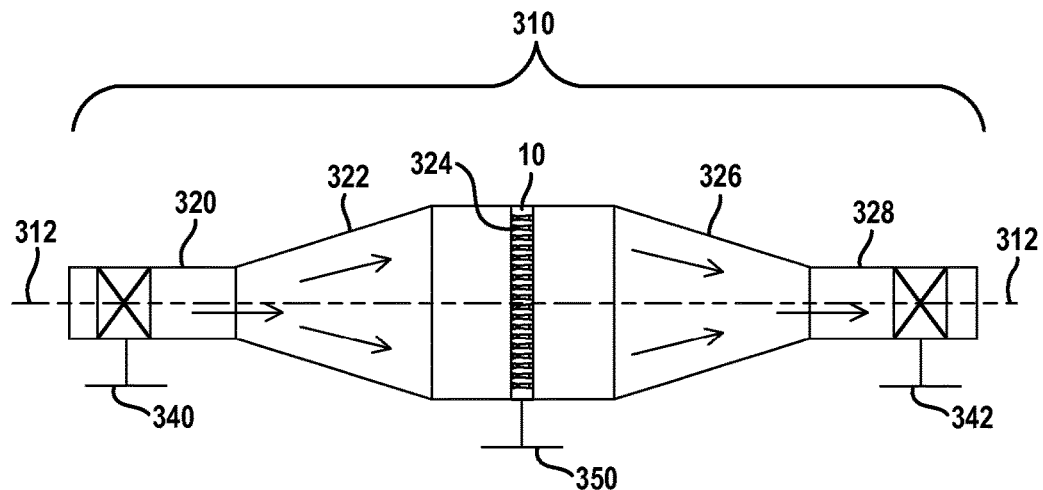
FIG. 3 is a cross-sectional view of a cavitation control device.

Referring now to FIG. 3, a cavitation control device 310 is illustrated having one cavitation plate 10. The cavitation control device 310 has a longitudinal axis 312 that may be parallel with the longitudinal axis 16 illustrated in FIG. 2 and the flow direction illustrated by arrow 14 in FIG. 1A. The cavitation control device 310 includes an inlet pipe 320 having a first diameter. Liquid to be treated enters through the inlet pipe 320. An expander channel 322 expands the diameter of the flow passage from a first diameter corresponding to the inlet pipe 320 to a second diameter corresponding to a cavitation plate channel 324. The cavitation plate channel 324 may have a diameter corresponding to the cavitation plate 10. The liquid flowing from the inlet channel through the expander channel and into the cavitation plate channel is exposed to the cavitation plate 10 where cavitation takes place in a manner described relative to FIG. 2. A reducer channel 326 reduces the diameter of the fluid passage from the cavitation plate channel diameter to a reduced diameter corresponding to an outlet pipe 328. The outlet pipe 328 discharges the fluid from the cavitation control device 310.

The cavitation control device 310 may also include an inlet valve 340 and an outlet valve 342 that is used for controlling the amount of flow, or the flow rate, through the cavitation control device 310. The inlet valve 340 is disposed within the inlet pipe 320. The outlet valve 342 is disposed within the outlet pipe 328. The valves 340, 342 may be adjusted to create a sufficient flow resistance to match a pressure boost generated by a pump as will be described further below. A pump may be used to provide a flow of fluid to the cavitation control device 310. When a greater amount of cavitation is needed to accomplish a desired level of liquid treatment, the inlet valve 340 is partially closed and outlet valve 342 is opened greater than the inlet valve 340 so that a constant pressure drop is formed across the cavitation control device 310. The pressure of the fluid prior to the cavitation plate 10 is reduced, resulting in a lower pressure in the throat 214 of each of the flow elements 12 illustrated in FIG. 2. Thus, more cavitation bubbles are formed within the throat 214 of FIG. 2. Because the valve 342 is more fully open to maintain a total constant pressure drop across the cavitation control device 310, the pressure downstream of the cavitation control device 310 is also reduced. When less cavitation is desired, inlet valve 340 is more fully opened and valve 342 is more fully closed. This results in the pressure around the cavitation plate being reduced and thus the amount of cavitation in each flow element 12 is reduced.

During operation, the cavitation plate 10 may become partially blocked with debris, particularly in the area of the converging nozzles 212 illustrated in FIG. 2. A handle 350 coupled to the cavitation plate 10 may be used to flip the cavitation plate 180 degrees, so that flow through the flow elements 12 is reversed to a reverse direction from the direction illustrated in FIG. 2. That is, fluid would enter the outlet channel 220 and exit through the inlet channel 210. Any debris lodged within the flow elements 12 may be dislodged.

Figure 4:
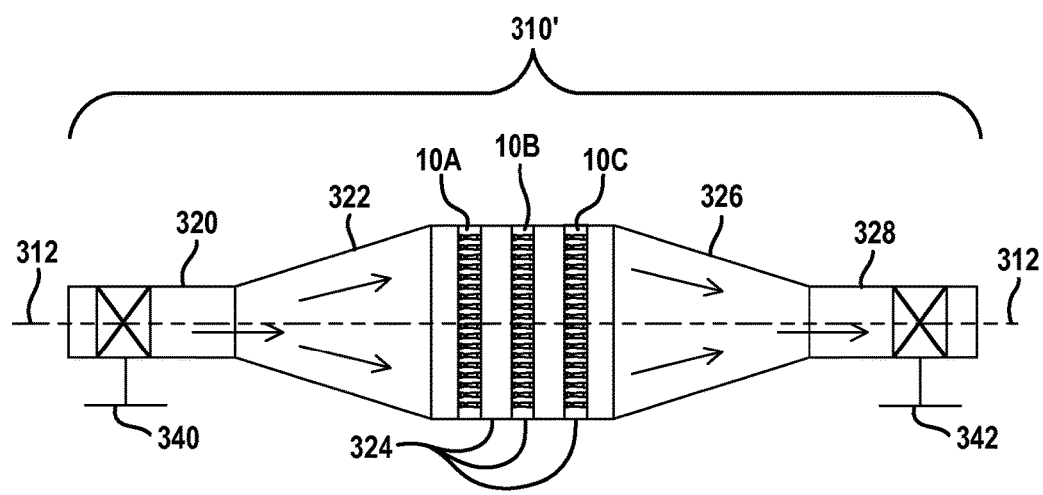
FIG. 4 is a cross-sectional view of an alternate example of a cavitation control device.

Referring now to FIG. 4, a second example of a cavitation control device 310' is illustrated. In this example, the cavitation plate 10 is replaced by three cavitation plates 10A, 10B and 10C. The cavitation plates 10A-10C are placed in series so that the fluid flows through each of the plates 10A-10C. Although three cavitation plates 10A-10C are illustrated, two or greater than three cavitation plates may be implemented in a system depending upon the desired amount of purification required in the process. Each cavitation plate 10A-10C may also have a varied geometry. That is, each of the flow elements 12 on the different cavitation plates 10 may have different geometries that vary according to the desired results of the process. Thus, each cavitation plate 10 may have flow elements having an altered geometry to achieve a desired flow rate. The geometry may change from cavitation plate to cavitation plate.

Figure 5:
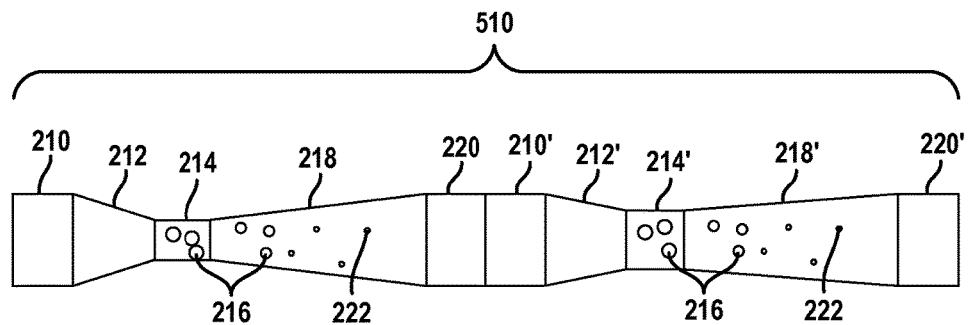
FIG. 5 is a cross-sectional view of a super flow element.

Referring now to FIG. 5, a plurality of flow elements 12 may be disposed in series to form a super flow element 510. The super flow element 510 may include one or more flow elements 12, 12' disposed in series. In this example, two flow elements 12 are provided in series. Each of the flow elements may be configured in a similar manner to that set forth in FIG. 2. The flow elements 12, 12' may be identical or may have the geometry, such as one or more diameters, changed. That is, each flow element may contain an inlet channel 210, a converging nozzle 212, a throat 214, a diverging diffuser 218 and an outlet channel 220. The first outlet channel 220 may be in communication with the second inlet channel 210' which is in fluid communication with a second converging nozzle 212'. The second converging nozzle 212' is in fluid communication with a second throat 214', which in turn is in communication with a second diverging diffuser 218'. A second outlet channel 220' discharges fluid from the super flow element 510.

The super flow element 510 thus creates bubbles 216 in the first flow element 12 and again bubbles 216' are formed in the second flow element 12'. The bubbles are also collapsed in their respective flow elements.

It should also be noted that the diameter of the first throat 214 may be reduced compared to that of the second throat 214'. Because of the loss of static pressure through each element due to frictional losses and flow disruption from cavitation, the first throat 214 may be reduced in diameter compared to the second throat 214' to achieve sufficiently low pressure for cavitation due to the relatively high inlet pressure. The second throat 214' may be larger in diameter to lower the pressure at the inlet and thus not requiring as much of a drop in static pressure from the Bernoulli effect. The super flow element 510 allows the liquid flow to be exposed to multiple cavitation events to increase the beneficial effects of cavitation in a small space to achieve the desired amount of purification in the process.

Figure 6:
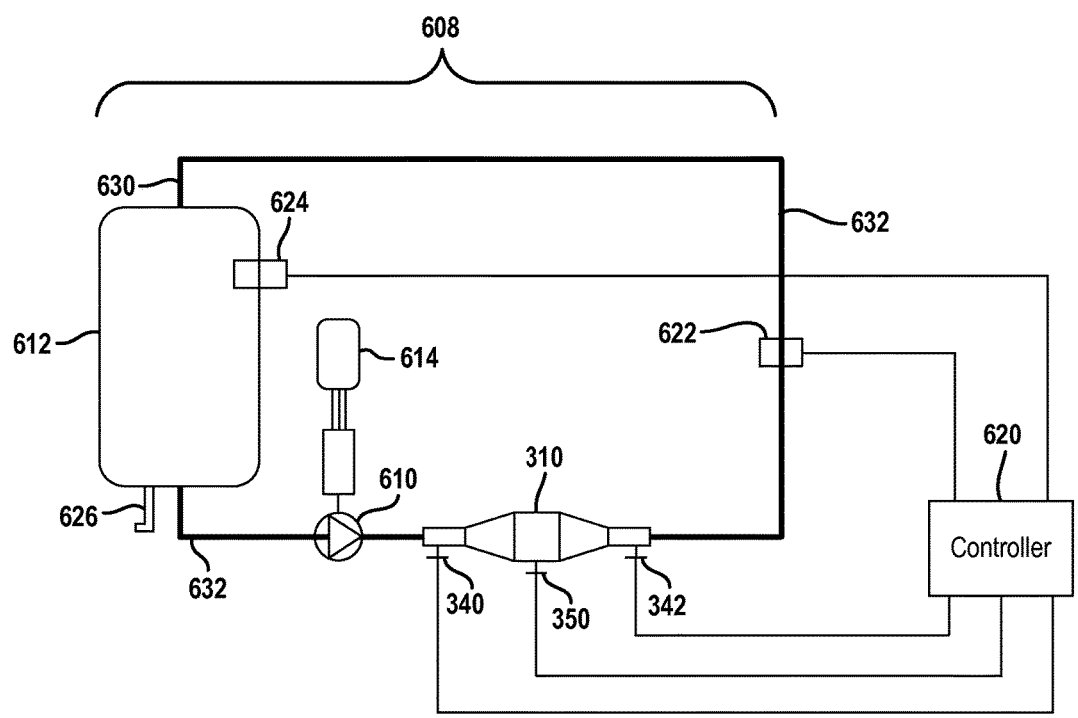
FIG. 6 is a schematic view of a process system having a cavitation control device.

Referring now to FIG. 6, a fluid treatment system 608 is illustrated. In the present example, a pump 610 is used to circulate fluid from a fluid tank 612. Fluid flow from the fluid tank 612 is drawn through the pump 610 and into the cavitation control device 310. The cavitation control device 310 may be configured in a manner similar to that illustrated in FIG. 3 or the second example in FIG. 4. Further, the cavitation control device 310 may also have flow elements configured corresponding to those illustrated in FIG. 5.

The pump 610 may also be in communication with a variable speed drive 614. The variable speed drive 614 may allow an increase in pressure and flow as required to achieve a desired level of fluid treatment.

A controller 620 may be used to monitor the process and control the opening and closing of the valves 342 and also control the movement of the handle 350 during a cleaning operation. The controller 620 may monitor various operating conditions using one or more sensors to achieve the desired flow. For example, a sensor 622 may communicate a flow rate or other operating condition or parameter of the fluid leaving the outlet pipe of the cavitation control device 310. The sensor 622 may also be an impurities detection sensor to monitor the purity or the amount of impurities within the fluid leaving the outlet pipe. It should be noted that the outlet pipe of the cavitation control device 310 may be in communication with an inlet 630 of the tank 612.

Another sensor 624 may be disposed within the tank 612. The sensor 624 may sense the amount of impurities within the tank 612. The process may continually cycle fluid through the pipes 632 until a desired amount of purification has been performed. This may be referred to as a batch process. A drain 640 may be used to drain the purified fluid from the tank 612. The drain 640 may be an independent device or may be a device coupled to the pipe 632 such as a valve.

In operation, the tank 612 is filled with fluid from an external source through pipe 626. Fluid flow from the tank 612 may be provided to the inlet pipe 632 of the cavitation control device 310. The fluid may have contaminants therein. The expander channel 322 expands the fluid flow across the cavitation plate 10 disposed within the cavitation control device 310. The amount of fluid flow across the cavitation plate 10 may be controlled by controlling the valves 340 and 342. Fluid within the flow elements 12 of the cavitation plate 10 enters the converging nozzle 212 where the fluid is accelerated and the static pressure drops in response to the increased flow. The flow channel is sized so that the static pressure falls below the vapor pressure of the throat and cavitation bubbles are formed therein. The fluid flow with the cavitation bubbles is communicated to the diverging diffuser 218. The diverging diffuser 215 is shaped so that the static pressure increase causes the collapse of the cavitation bubbles and thus any cellular matter is exposed to intense pressure and thus sterilization of the fluid may be performed. The cellular matter may be breached and thus destroyed. After a sufficient amount of purification, purified fluid may be removed from the tank 612 through the pipe 626.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A cavitation plate having a thickness comprising:
    a plurality of flow elements through the thickness, each of the plurality of flow elements comprises,
    an inlet channel;
    a converging nozzle coupled to the inlet channel;
    a throat in fluid communicating with the converging nozzle;
    a diverging diffuser in fluid communication with the throat;
    an outlet channel in fluid communication with the diverging diffuser;
    a second inlet channel in fluid communication with the outlet channel;
    a second converging nozzle in fluid communication with the second inlet channel;
    a second throat in fluid communication with the second converging nozzle;
    a second diverging diffuser in fluid communication with the throat; and
    a second outlet channel in fluid communication with the second diverging diffuser, wherein the throat has a first diameter less than a second diameter of the second throat.

2. The cavitation plate as recited in claim 1, wherein the plurality of flow elements are all oriented in a first direction.

3. The cavitation plate as recited in claim 2, wherein the first direction is parallel to an axial direction of the inlet channel and the outlet channel.

4. A cavitation control device comprising:
    an inlet pipe;
    an expander channel in fluid communication with the inlet pipe;
    a cavitation plate received within a cavitation plate channel in fluid communication with the expander channel;
    said cavitation plate comprising;
        a plurality of flow elements through the thickness, each of the plurality of flow elements comprises,
        an inlet channel;
        a converging nozzle coupled to the inlet channel;
        a throat in fluid communication with the converging nozzle;
        a diverging diffuser in fluid communication with the throat;
        an outlet channel in fluid communication with the diverging diffuser;
    a reducer channel in fluid communication with the cavitation plate channel; and
    an outlet pipe in fluid communication with the reducer channel.

5. The cavitation control device as recited in claim 4, wherein the plurality of flow elements are oriented in a first direction.

6. The cavitation control device as recited in claim 5, wherein the first direction is parallel to a longitudinal axis of the inlet pipe and the outlet pipe.

7. The cavitation control device as recited in claim 6, wherein the cavitation plate comprises a plurality of cavitation plates.

8. The cavitation control device as recited in claim 7, wherein the cavitation plates are parallel.

9. The cavitation control device as recited in claim 6, further comprises a handle for rotating the cavitation plate into a reverse direction.

10. The cavitation control device as recited in claim 4, wherein the inlet pipe comprises a first valve and said outlet pipe comprising a second valve.

11. A system comprising:
a cavitation control device as recited in claim 10;
a sensor sensing a condition; and
a controller coupled to the sensor, the first valve and the second valve, said controller controlling the first valve and the second valve in response to the condition.

12. A system as recited in claim 11, wherein the condition comprises flow rate.

13. The system as recited in claim 11, wherein the condition comprises purity.

14. The system as recited in claim 11, further comprising a pump coupled to a variable speed drive and a fluid tank, said controller controlling the variable speed drive in response to the condition.

15. A fluid treatment system comprising:
a fluid tank comprising an inlet and an outlet;
a pump in fluid communication with the fluid tank;
a cavitation control device as recited in claim 4, in fluid communication with the pump.

16. The fluid treatment system as recited in claim 15, wherein the pump is coupled to a variable speed drives that variable operates the pump.

17. The fluid treatment system as recited in claim 15, wherein the cavitation control device communicates fluid to the inlet of the fluid tank.

18. A cavitation plate having a thickness comprising;
a plurality of flow elements arranged in parallel through the thickness, each of the plurality of flow elements comprises,
an inlet channel oriented parallel to a fluid flow direction on a first side of the plate;
a converging nozzle coupled to the inlet channel;
a throat in fluid communication with the converging nozzle;
a diverging diffuser in fluid communication with the throat; and
an outlet channel oriented parallel to the flow direction in fluid communication with the diverging diffuser on a second side of the plate.

19. The cavitation plate as recited in claim 18 wherein the converging nozzle has a shorter length than the diverging diffuser.

* * * * *